June 17, 1952   J. MASTERTON   2,601,043
PROTECTIVE MEANS FOR ELECTRICITY STORAGE BATTERY CASES
Filed April 13, 1951

Inventor
J. Masterton

Patented June 17, 1952

2,601,043

UNITED STATES PATENT OFFICE 2,601,043

PROTECTIVE MEANS FOR ELECTRICITY STORAGE BATTERY CASES

John Masterton, Dorridge, Birmingham, England, assignor to Joseph Lucas Limited, Birmingham, England Application April 13, 1951, Serial No. 220,781
In Great Britain February 11, 1950

1 Claim. (Cl. 136—181)

When electricity storage battery cases are being transported in quantities from one position to another, as within a factory, or from a factory to a destination, the unavoidable impacts between contiguous cases, especially when the latter are made from moulded plastic material, are liable to result in fracturing of the cases. Experience has proved that the temporary wrappings ordinarily provided on such cases afforded inadequate protection against the risk of fracture, and the object of the present invention is to provide more effective protective means.

The invention comprises a band made from rubber or like material adapted to embrace a battery case and having formed on or incorporated therewith protuberant buffer pieces at positions corresponding to the corners or other parts of the case.

Figure 1:
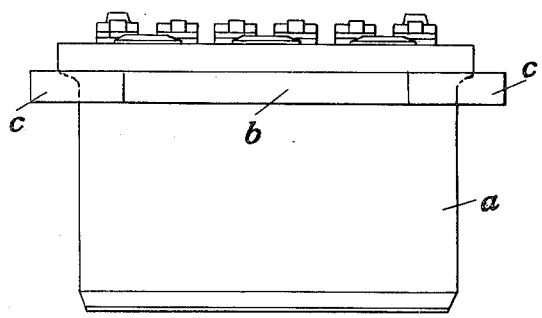
Figure 2:
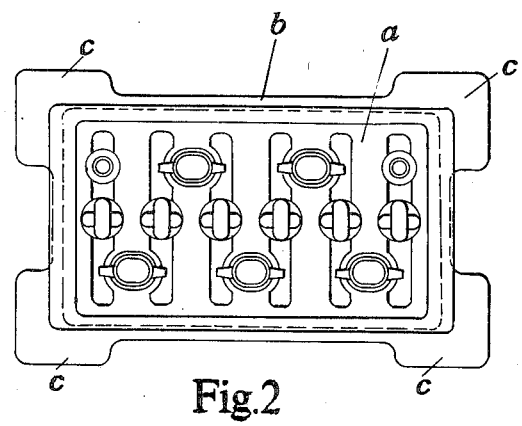

In the accompanying drawings:

Figure 1 is a side elevation and Figure 2 a plan of a battery provided with protective means in accordance with the invention.

Referring to the drawings, which represent a battery $a$ such as is used on motor vehicles, there is provided a narrow elastic band $b$ made from rubber or like material, and adapted to embrace the battery case tightly. On this band are formed or incorporated four protuberant buffer or cushion-like pieces $c$ corresponding in position to the corners of the case. Alternatively these pieces may be provided at other positions and any desired number of such pieces may be provided.

The buffer pieces serve to prevent adjacent cases from colliding with each other during transit in a manner which otherwise might result in fracture of the cases.

On reaching the destination, the protective means can be removed, and it is intended that they should then be returned for further use. Whilst protective bands as above described may be more expensive than the conventional wrappings, this condition is off-set by the savings which they effect in the cost of replacement of cracked cases when the cases are handled in large quantities.

Having thus described my invention what I claim as new and desire to secure by Letters Patent is:

Protective means for use on electricity storage battery cases, comprising a band made from rubber or like material adapted removably to embrace a battery case and having formed on or incorporated therewith protuberant buffer pieces at positions corresponding to the corners or other parts of the case.

JOHN MASTERTON.

REFERENCES CITED

The following references are of record in the file of this patent:

UNITED STATES PATENTS

| Number | Name | Date |
| --- | --- | --- |
| 1,220,603 | Cartwright | Mar. 27, 1917 |
| 1,558,384 | Mattson | Oct. 20, 1925 |
| 2,367,786 | Laning | Jan. 23, 1945 |

FOREIGN PATENTS

| Number | Country | Date |
| --- | --- | --- |
| 571,435 | Great Britain | Aug. 24, 1945 |